United States Patent [19]

Bingham

[11] Patent Number: 4,459,083
[45] Date of Patent: Jul. 10, 1984

[54] SHAPES FOR ROTATING AIRFOILS

[75] Inventor: Gene J. Bingham, Hampton, Va.

[73] Assignee: The United States of America as represented by the Administrator of the National Aeronautics and Space Administration, Washington, D.C.

[21] Appl. No.: 17,889

[22] Filed: Mar. 6, 1979

[51] Int. Cl.³ .............................................. B64C 11/18
[52] U.S. Cl. ................... 416/223 R; 416/242; 244/35 R
[58] Field of Search .............. 416/DIG. 2, 223 R, 242; 244/35 R

[56] References Cited

U.S. PATENT DOCUMENTS

| 1,719,293 | 7/1929 | Gripon | 244/35 |
| 3,558,081 | 1/1971 | Williams | 416/170 |
| 3,902,821 | 9/1975 | Robinson | 416/242 |

FOREIGN PATENT DOCUMENTS

| 32532 | 4/1908 | Austria | 416/242 |
| 1326701 | 5/1962 | France | 416/242 |
| 449176 | 12/1974 | U.S.S.R. | 416/242 |

Primary Examiner—Louis J. Casaregola
Attorney, Agent, or Firm—Howard J. Osborn; John R. Manning

[57] ABSTRACT

This invention is an airfoil which has particular application to the blade or blades of rotor aircraft and aircraft propellers. The airfoil thickness distribution, camber and leading edge radius is shaped to locate the airfoil crest at a more aft position along the chord, and to increase the freestream Mach number at which sonic flow is attained at the airfoil crest. The upper surface of the airfoil has a general reduction in the surface slope back to the maximum ordinate which is about 40 percent of the airfoil chord. The reduced slope causes a reduction in velocity at the airfoil crest at lift coefficients from zero to the maximum lift coefficient. The leading edge radius is adjusted or shaped so that the maximum local Mach number at 1.25 percent chord and at the designed maximum lift coefficient is limited to about 0.48 when the Mach number normal to the leading edge is approximately 0.20. The lower surface leading edge radius is shaped so that the maximum local Mach number at the leading edge is limited to about 0.29 when the Mach number normal to the leading edge is approximately 0.20 and the lift coefficient is in the range of 0.0 to −0.2. This design moves the drag divergence Mach number associated with the airfoil to a higher Mach number over a range of lift coefficients resulting in superior aircraft performance.

6 Claims, 9 Drawing Figures

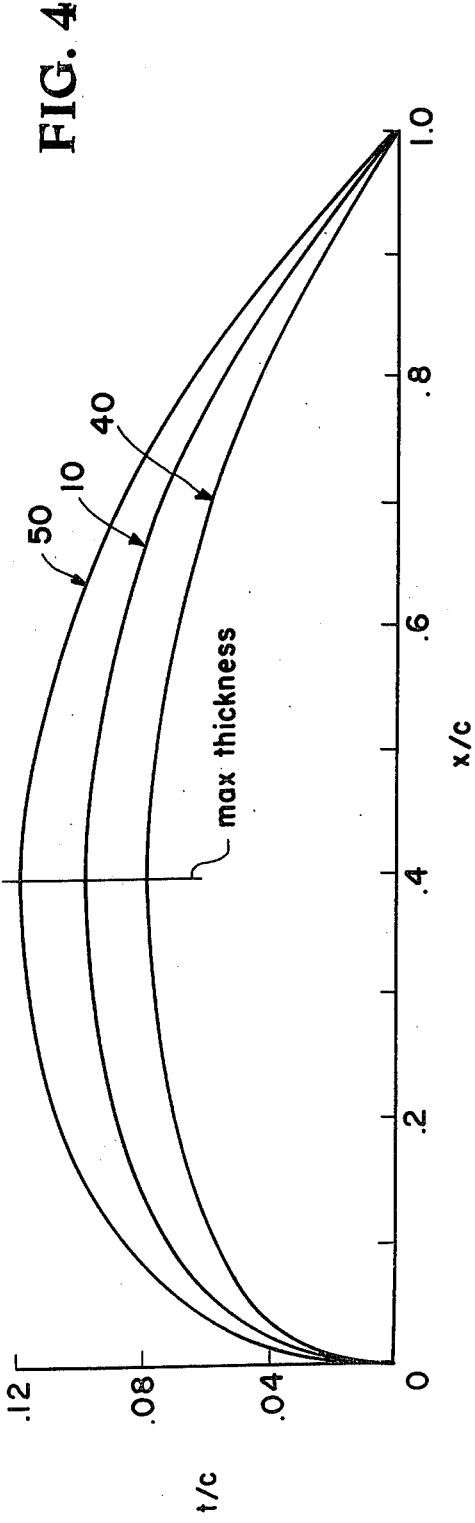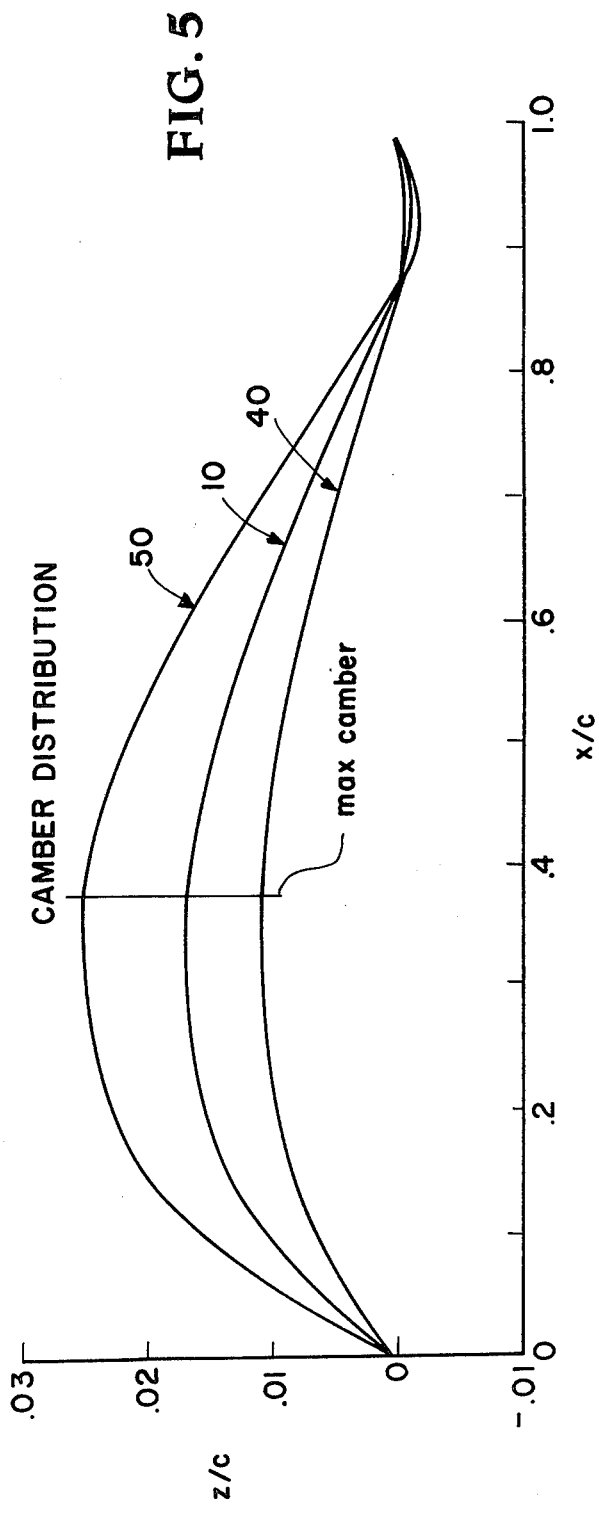

SHAPES FOR ROTATING AIRFOILS

ORIGIN OF THE INVENTION

The invention described herein was made by an employee of the Department of the Army and may be manufactured and used by or for the United States Government for governmental purposes without the payment of any royalties thereof or therefor.

BACKGROUND OF THE INVENTION

This invention relates to an airfoil design for rotating airfoils which has particular application to the blades of a rotor type aircraft (i.e., a helicopter) and aircraft propellers.

Typically, the helicopter forward flight velocity is limited by the increase in airfoil section drag and/or pitching moment that results from the section operational Mach number and lift coefficient. The airfoil section requirements for a helicopter rotor are more complex than those for a fixed wing aircraft. A single design lift coefficient does not exist because, on a single revolution of the rotor, the airfoil section experience lift coefficients from negative values to maximum lift, and section Mach numbers from low subsonic to transonic value. Thus, the actual operating lift coefficients and Mach numbers for a rotor depend on the specific helicopter design and flight conditions.

In designing airfoil sections for rotor aircraft the drag divergence Mach number for the airfoil section employed by the aircraft is of considerable importance. Not only do the power requirements increase rapidly when drag divergence is exceeded, but for most airfoils, the section pitching moment will increase substantially at a section Mach number slightly greater than that for drag divergence to result in increases in non-steady blade loads. In many instances over one-third of the rotor disc area operates at Mach numbers above drag divergence.

Prior art airfoil sections are designed to provide low drag and pitching moment; however, drag and pitching moment increases are normally encountered as flight velocity is increased resulting in a poor drag divergent profile. A poor drag divengence is attributed to one or both of the following factors: (1) local supersonic flow extends behind the airfoil crest at a given lift coefficient to result in an aft facing suction force, and (2) the presence of local supersonic flow can result in shock waves which separate the boundary layer. Both of the above drag increases require additional power to overcome drag, and to propell the aircraft. Drag divergence is a particular problem when the aircraft rotor is operating in conditions for high speed flight.

Accordingly, it is an object of the invention to provide an airfoil section which will increase drag divergence to higher section Mach numbers.

A further object of the invention is to provide a series or family of airfoils used in conjunction to improve the drag divergent profile.

Yet another object of the inventidn is to shape the airfoil sections by regulating the airfoil thickness distribution, camber and leading edge radius in a manner to locate the airfoil crest at a more aft position along the chord regardless of lift coefficients encountered.

Another object of the invention is to reflex the trailing edge of the airfoil to provide near zero pitching moment.

Still another object of the invention is to provide an airfoil section which will allow increased flexibility in rotor plan form and twist distribution.

A further object of the invention is to provide improved rotor performance to result in fuel savings and/or permit increases in flight speed.

SUMMARY OF THE INVENTION

These and other objects of the invention are achieved by providing a rotor blade or propeller which has an airfoil section or sections of particular shape. The airfoil section shape which provides the desired result has a leading edge upper and lower radius which is designed to limited the local Mach numbers of the freestream to desired values to be explained more fully subsequently. The upper surface of the airfoil section is shaped such that there is a general reduction in the surface slope back to the maximum ordinate which is about 40 percent chord. Behind the termination of the positive slope (the zero slope point), the slope of the upper surface is negative and decreases continuously to a position about 87 percent chord, at which point the surface becomes positive and increases continuously to the trailing edge.

From the point the lower surface leading edge radius fairs into the lower surface, the lower surface slope is negative and decreases continuously to a position of approximately 40 percent chord. For the more highly cambered airfoil sections the slope to the zero position may terminate as far back as approximately 60 percent chord. Behind some position in this range, the lower surface slope turns upward toward the trailing edge and is positive and increases continuously until terminated at the trailing edge.

BRIEF DESCRIPTION OF THE DRAWINGS

FIG. 4 is a plot of representative invention airfoil sections showing thickness distribution;

FIG. 5 is a plot of representative invention airfoil sections showing camber distribution;

Figure 7:
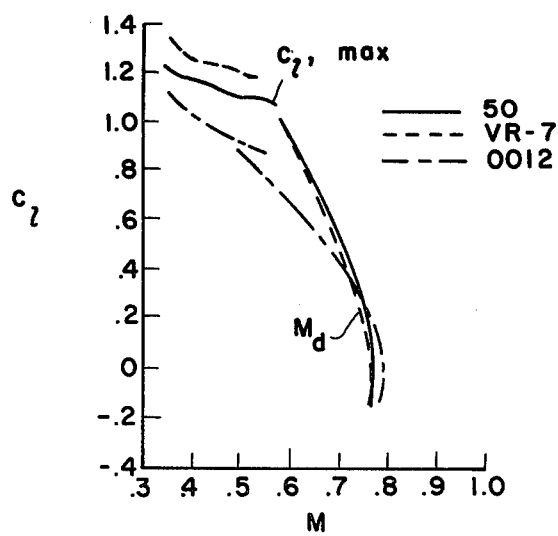
Figure 8:
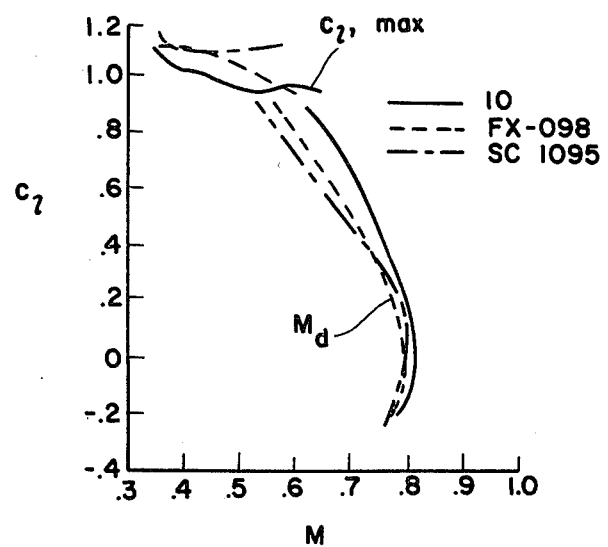
Figure 9:
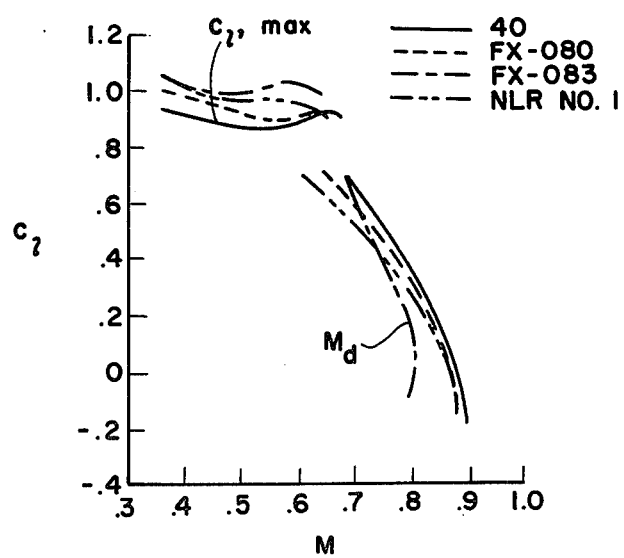

IFIG. 6 is a plot of lift coefficient against Mach number showing the drag divergence for three different invention airfoil profiles;

FIG. 7 is a plot of lift coefficient against Mach number comparing the invention drag divergence with other prior art 12 percent thick airfoils;

FIG. 8 is a plot of lift coefficient against Mach number showing a comparison of the invention airfoil with other prior art 10 percent thick airfoils; and FIG. 9 is a plot of lift coefficient against Mach number comparing the drag divergence of the invention airfoil with other prior art 8 percent thick airfoils.

DETAILED DESCRIPTION OF THE INVENTION

Figure 1:
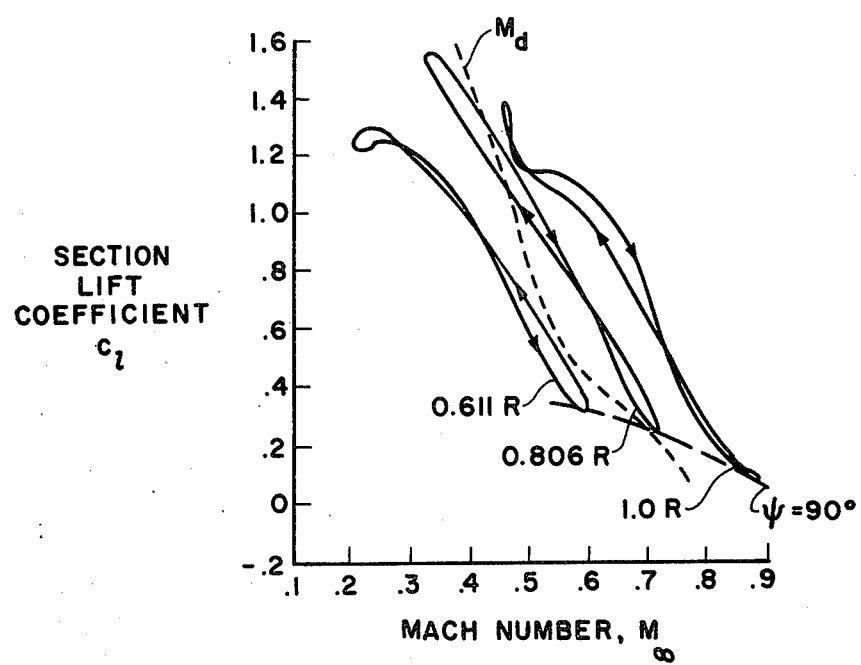
FIG. 1 is a plot of section lift coefficient against Mach number showing a representative envelope for a helicopter airfoil operating at approximately 60 percent radius, 80 percent radius and at the tip radius of the blade.

The interaction of the helicopter rotor blade with the freestream is rather complex as illustrated in FIG. 1. It is apparent from FIG. 1 that at a point of 0.611 R, which represents the distance from the rotor hub or root out toward the tip of the blade, that the section profile is considerably different than at the positions 0.806 R and at 1 R which is the tip of the rotor blade. At the rotor blade tip, the airfoil section advancing into the wind operates at a Mach number near 0.9, at near zero lift coefficient whereas the retreating airfoil section operates at a Mach number of about 0.45 and a lift coefficient of 1.4. At the inboard position of 0.611 R, the airfoil section is advancing into the freestream at a Mach number of approximately 0.6 and a lift coefficient of 0.3 and on the retreating side the Mach number is about 0.2 at a lift coefficient of about 1.3.

FIG. 1 shows the drag divergence Mach number $M_d$ of the rotor airfoil plotted on the curve. Drag divergence Mach number is defined as the airfoil section Mach number at which the rate of increase of drag coefficient with Mach number is 0.1. For most airfoils, the section pitching moment will increase substantially at a section Mach number slightly greater than for drag divergence. For the case of FIG. 1, beyond about 0.7 R to 0.8 R (which includes over one-third of the rotor disc area) the airfoil sections operate at a Mach number above drag divergence. The related increase in drag and the related increase in pitching moment has a prime influence on the power required to drive the rotor and the non-steady blade loads. Therefore, an airfoil section or sections is desired which have a greater drag divergence Mach number at all lift coefficients.

Figure 2:
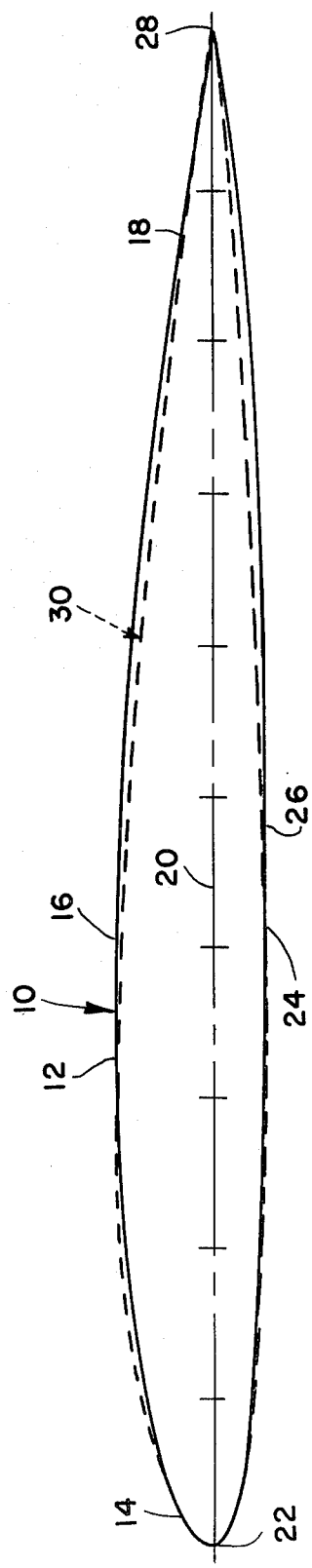
FIG. 2 is a profile of the invention airfoil section, superimposed on a prior art airfoil section design.

The section disclosed in FIG. 2 of the drawings is designed to accomplish this result and is designated generally by the reference numeral 10. The airfoil section 10 has an upper surface 12 which is associated with the leading edge radius thereof 14. The leading edge radius 14 is adjusted or shaped so that the maximum local Mach number at 1.25 percent chord and aft, and at the designed maximum lift coefficient, is limited to about 0.48 when the Mach number normal to the leading edge is approximately 0.20.

From the point or position at which the leading radius 14 fairs into the upper surface 12, the surface slope is positive and continuously decreasing back to approximately the 40 percent chord station 16. This is true for a section which is symmetrical and moderately cambered. The zero slope position of the upper surface 12 may move slightly forward, to approximately 37 percent chord, for example, as the amount of camber is increased.

The zero slope position of the upper surface occurs at the point or position 16. The slope of the upper surface is then negative and decreases continously back to approximately the 87 percent chord station designated by the reference numeral 18. The upper surface slope then is positive and continuously increases back to the trailing edge 28.

The lower surface leading edge radius is shaped so that the maximum local Mach number at and behind the leading edge is limited to about 0.29 when the Mach number normal to the leading edge is approximately 0.20 and the lift coefficient is in the range of 0.0 to −0.2. From the point the lower surface leading edge radius fairs into the lower surface, the lower surface slope is negative and decreases continuously to approximately the 40 percent chord location designated by the reference numeral 26. This is true for symmetrical and slightly cambered airfoils. For more highly cambered airfoils the camber has a larger influence on the lower surface 24, because of the positive camber, resulting in an aft movement of the zero lower surface slope point or position 26 to as much as 60 percent chord. Beyond the lower surface zero slope position, the slope is positive and increases continuously to the trailing edge 28.

The trailing edge thickness is approximately two percent of the total airfoil thickness for practical construction of the airfoils.

Figure 3:
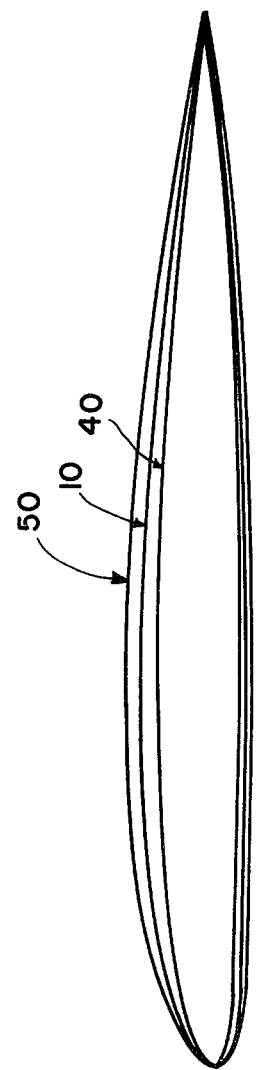
FIG. 3 shows a family of airfoils representative of section profiles.

FIG. 3 shows a representative family of airfoil profiles which might be utilized in construction of the total helicopter rotor blade. The intermediate profile 10 is a section which might be utilized in the intermediate area of the rotor blade. The airfoil section 40 is thinner and has less camber, and normally would be used at the tip of the rotor blade section. The airfoil section 50 is thicker and has more camber, being the better design for the base or root section of the rotor blade.

Because of the difficulty involved in giving an adequate word description of the particular airfoil section being described, the coordinates for the airfoil sections 10, 40 and 50 are set forth respectively in the following Tables I, II and III.

TABLE I

| UPPER SURFACE | | LOWER SURFACE | |
| --- | --- | --- | --- |
| XU | ZU | XL | ZL |
| 0.000000 | 0.000000 | 0.000000 | 0.000000 |
| .003100 | .009060 | .003100 | −.007650 |
| .010930 | .017000 | .010930 | −.012300 |
| .024030 | .024620 | .024030 | −.016190 |
| .042140 | .031930 | .042140 | −.019500 |
| .063470 | .038540 | .063470 | −.022030 |
| .087240 | .044350 | .087240 | −.024000 |
| .113050 | .049440 | .113050 | −.025610 |
| .140750 | .053760 | .140750 | −.026960 |
| .170230 | .057480 | .170230 | −.028170 |
| .201370 | .060510 | .201370 | −.029230 |
| .234020 | .062920 | .234020 | −.030200 |
| .268070 | .064740 | .268070 | −.031070 |
| .303430 | .065960 | .303430 | −.031840 |
| .339950 | .066610 | .339950 | −.032490 |
| .377330 | .066720 | .377330 | −.033010 |
| .415240 | .066270 | .415240 | −.033370 |
| .453360 | .065280 | .453360 | −.033570 |
| .491480 | .063760 | .491480 | −.033600 |
| .529490 | .061700 | .529490 | −.033460 |
| .567460 | .059090 | .567460 | −.033130 |
| .605470 | .055930 | .605470 | −.032600 |
| .643780 | .052200 | .643780 | −.031840 |
| .682760 | .047870 | .682760 | −.030790 |
| .722320 | .042960 | .722320 | −.029390 |
| .761850 | .037580 | .761850 | −.027580 |
| .800020 | .032000 | .800020 | −.025360 |
| .836230 | .026440 | .836230 | −.022720 |
| .870820 | .020960 | .870820 | −.019590 |
| .904090 | .015640 | .904090 | −.015940 |
| .936310 | .010520 | .936310 | −.011710 |
| .968280 | .006000 | .968280 | −.006330 |
| 1.000000 | .001800 | 1.000000 | −.000200 |

TABLE II

| UPPER SURFACE | | LOWER SURFACE | |
| --- | --- | --- | --- |
| XU/C | ZU/C | Xl/C | Zl/C |
| 0.000000 | 0.000000 | 0.000000 | 0.000000 |
| .003140 | .006710 | .003140 | −.006560 |
| .011700 | .013120 | .011700 | −.010960 |
| .025340 | .019000 | .025340 | −.014450 |
| .043690 | .024550 | .043690 | −.017290 |
| .065080 | .029520 | .065080 | −.019510 |
| .088890 | .033890 | .088890 | −.021290 |
| .114710 | .037700 | .114710 | −.022780 |
| .142390 | .040960 | .142390 | −.024030 |
| .171860 | .043760 | .171860 | −.025130 |
| .202980 | .046060 | .202980 | −.026090 |
| .235600 | .047890 | .235600 | −.026930 |
| .269590 | .049280 | .269590 | −.027910 |
| .304840 | .050230 | .304840 | −.028530 |
| .341210 | .050750 | .341210 | −.028770 |
| .378400 | .050870 | .378400 | −.029130 |

TABLE II-continued

| UPPER SURFACE | | LOWER SURFACE | |
|---|---|---|---|
| XU/C | ZU/C | XI/C | ZI/C |
| .416120 | .050570 | .416120 | −.029340 |
| .454040 | .049860 | .454040 | −.029390 |
| .491990 | .048760 | .491990 | −.029290 |
| .529830 | .047250 | .529830 | −.029020 |
| .567660 | .045330 | .567660 | −.028580 |
| .605530 | .043000 | .605530 | −.027960 |
| .643670 | .040240 | .643670 | −.027130 |
| .682380 | .037040 | .682380 | −.026050 |
| .721500 | .033420 | .721500 | −.024690 |
| .760570 | .029440 | .760570 | −.023000 |
| .798420 | .025280 | .798420 | −.020990 |
| .834570 | .021070 | .834570 | −.018670 |
| .869270 | .016860 | .869270 | −.015990 |
| .902800 | .012710 | .902800 | −.012930 |
| .935430 | .008640 | .935430 | −.009420 |
| .967820 | .004900 | .967820 | −.005130 |
| 1.000000 | .001300 | 1.000000 | −.000500 |

TABLE III

| UPPER SURFACE | | LOWER SURFACE | |
|---|---|---|---|
| XU | ZU | XL | ZL |
| 0.000000 | 0.000000 | 0.000000 | 0.000000 |
| .003676 | .010004 | .003676 | −.009038 |
| .012513 | .019429 | .012513 | −.015682 |
| .025971 | .028639 | .025971 | −.020846 |
| .043800 | .037607 | .043800 | −.024854 |
| .065206 | .045919 | .065206 | −.027761 |
| .089183 | .053294 | .089183 | −.029819 |
| .115256 | .059782 | .115256 | −.031348 |
| .143250 | .065343 | .143250 | −.032511 |
| .173028 | .070120 | .173028 | −.033525 |
| .204412 | .074044 | .204412 | −.034407 |
| .237219 | .077144 | .237219 | −.035236 |
| .271313 | .079481 | .271313 | −.036022 |
| .306588 | .081043 | .306588 | −.036761 |
| .342916 | .081854 | .342916 | −.037440 |
| .380051 | .081942 | .380051 | −.038024 |
| .417745 | .081308 | .417745 | −.038492 |
| .455766 | .079963 | .455766 | −.038827 |
| .493911 | .077921 | .493911 | −.039014 |
| .532087 | .075179 | .532087 | −.039037 |
| .570336 | .071736 | .570336 | −.038877 |
| .608754 | .067583 | .608754 | −.038506 |
| .647546 | .062696 | .647546 | −.037881 |
| .687103 | .057038 | .687103 | −.036923 |
| .727222 | .050656 | .727222 | −.035536 |
| .767097 | .043743 | .767097 | −.033637 |
| .805323 | .036668 | .805323 | −.031211 |
| .841529 | .029647 | .841529 | −.028241 |
| .874375 | .023128 | .874375 | −.024860 |
| .905597 | .016950 | .905597 | −.020750 |
| .936152 | .011397 | .936152 | −.015376 |
| .967548 | .006158 | .967548 | −.008915 |
| 1.000000 | .001250 | 1.000000 | −.001250 |

FIG. 2 shows a dotted line outline of a representative prior art airfoil section designated generally by the reference numeral 30, and being superimposed on the airfoil section 10. The purpose of the airfoil section 30 being superimposed on the airfoil 10 is to show the actual difference in shape of the two airfoils.

Although the particular shapes and the coordinates of the airfoil sections 10, 40 and 50 are shown and described in the specification, it is to be understood that the invention is not limited to these particular shapes and designs. For a given set of airfoil coordinates, the amount of camber is selected as a compromise between the maximum lift coefficient realized with the airfoil section and the drag divergence Mach number of that section. For example, as the amount of camber is increased, the maximum lift coefficient will generally increase and the velocity at the airfoil crest at zero lift coefficient will also increase. Because of the increase in crest velocity, sonic velocity at the crest will occur at lower stream Mach numbers and thus the drag divergence will occur at lower stream Mach numbers. Airfoil crest is defined as the tangency point between the airfoil surface and the wind axis, the airfoil crest moves forward on the airfoil as the angle of attack is increased. In a similar manner, increase in section thickness-to-chord ratio will have an influence similar to the increase in camber. Because of these influences, the thicker sections with more camber would normally be used on the more inboard stations of the rotor blade radii. Also, it may be desirable to design a given helicopter rotor blade with the thicker airfoil section used at the lower radial stations in order to increase blade stiffness and to reduce blade drop at the tips.

FIG. 4 shows a plot of the thickness distribution of the airfoil sections 10, 40 and 50. The scale of the plot is in percent of chord t/c representing the thickness-to-chord ratio, x/c representing length divided by the total chord.

FIG. 5 shows a plot of camber distribution which is also scaled in percent of chord, z/c representing the upper surface vertical coordinates over total length of chord, and x/c representing length divided by the total cord The values which define the thickness distribution curves of FIG. 4 at any x/c are scaled or proportional values for curves 50, 10 and 40. That is, specific values of t/c for curve 40 are 80 percent of those of the curve 10 because the thickness to chord ratio is 0.08 for the 40 curve and 0.10 for the 10 curve. Similarly, the specific values for curve 50 are 120 percent of those of curve 10 because the thickness-to-chord ratio is 0.12 for the 50 curve and is 0.10 for the 10 curve. Other thickness distributions can be formed in a similar manner to define other curves which are part of the family of airfoils.

In a manner similar to the thickness distribution of FIG. 4, the specific values of camber distribution of FIG. 5 are scaled values relative to each other for curves 50, 10 and 40. Additional amounts of camber can be defined by multiplying the specific values defining any one of these curves by a new ratio of camber.

When any one of the resulting scaled camber lines are added to any one of the scaled thickness distributions relating to FIG. 4, an additional airfoil shape can be defined which comes within the detailed description of the invention.

FIGS. 4 and 5 are thus further representative of the shapes of the various airfoil sections.

OPERATION OF THE INVENTION

Figure 6:
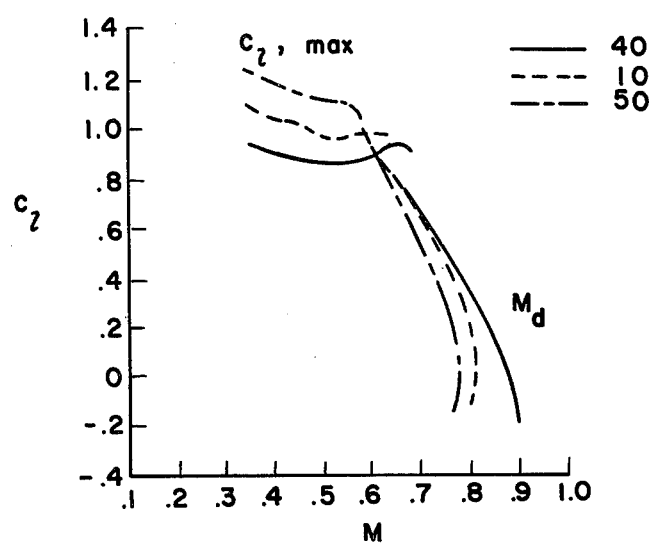

From the above description of the structural arrangement of the airfoil sections, the operation of the invention should now become apparent. The airfoil sections are designed to increase the drag divergent Mach nnmber, or stated otherwise to make drag divergence occur at a higher Mach number for a given lift coefficient. FIG. 6 shows a plot of lift coefficient against Mach number and shows the actual drag divergent curves $M_d$ for the specific airfoil shapes 10, 40 and 50.

FIGS. 7, 8 and 9 are also plots of the lift coefficient against Mach number. However, in these figures, the drag divergent curve for each of the airfoils is shown in comparison to prior art airfoils of similar thickness; these comparisons are made on the basis of tests of each airfoil listed. In FIG. 7, the invention airfoil section 50 has a 12 percent thickness and is represented by the solid line. This drag divergence curve $M_d$ is compared with a drag divergent curve illustrated with dashed lines and entitled VR-7, and with a dash-dot line curve of a prior art arrangement designated as 0012. FIG. 7 shows that the invention drag divergent curve is at a higher Mach number over the range of lift coefficients providing a superior result.

FIG. 8 shows the comparison for a 10 percent airfoil which is the invention airfoil section 10. FIG. 9 shows a similar comparison for the 8 percent thick airfoils, the solid line being the invention airfoil section 50.

It is to be understood that the Mach number at which drag divergence occurs over the range of lift coefficients will vary not only with the camber and percent thickness airfoil, but is also affected by the particular helicopter with which the rotor blade is utilized. This statement is also applicable to the advantage gained in the form of increased performance and power which will vary depending on the type of helicopter with which the airfoil sections are utilized. Analyses have shown; however, that with a Bell Helicopter Company AH-1 aircraft, that movement of the drag divergent curve to a higher Mach number decreases the power required. Specifically, for this helicopter, an increase of 0.01 Mach number on the drag divergent plot at all lift coefficients resulted in 4 percent power savings for the aircraft. Thus, although the displacement of the drag divergent curve $M_d$ in FIGS. 7-9 are not of a great magnitude, it can be readily seen that a small displacement as explained above, results in a substantial improvement in the rotor aircraft performance. For example, in FIG. 8, at lift coefficients near 0.6, there is obviously very substantial improvement in aircraft performance. Furthermore, if the area between the prior art drag divergent curves and the invention drag divergent curve is converted to a power coefficient and integrated over the entire range of lift coefficients, it is readily apparent that the invention provides a decided improvement in power savings over the prior art.

It is to be understood that the forms of the invention shown are merely preferred embodiments and various changes can be made in the shape, size and the arrangement of the airfoil sections as will be readily apparent to those skilled in the art. Also, equivalent means may be substituted for those decribed and certain features may be used independently from other features described herein without departing from the spirit and scope of the invention.

What is claimed as new and desired to be secured by Letters Patent of the United States is:

1. An airfoil for a rotating blade such as a helicopter comprising:
   airfoil means;
   said airfoil means having upper surface means, lower surface means, a leading edge area, and a trailing edge;
   said leading edge area of said upper surface means being shaped at approximately 1.25 percent chord and aft to maximum chord thickness for limiting the local Mach number to approximately 0.48 at the design maximum lift coefficient when the freestream Mach number relative to the leading edge is approximately 0.20;
   said lower surface means leading edge area being shaped for limiting the local Mach number at said leading edge area and aft to maximum chord thickness to approximately 0.29 when the freestream Mach number relative to the leading edge is approximately 0.20 and the lift coefficient is in the range 0.0 to −0.2;
   said upper surface means having a surface slope which is positive and continuously decreasing from the position where it fairs into said upper surface leading edge area to a position at approximately 40 percent chord, a surface slope from approximately 40 percent chord to approximately 87 percent chord which is negative and decreases continuously, and from approximately 87 percent chord to said trailing edge a surface slope that is positive and increases continuously;
   said lower surface means having a slope from a point where it fairs into said lower surface leading edge area to a range of approximately 40 to 60 percent chord which is negative and decreasing continuously, thereafter the slope is positive increasing continuously to said trailing edge; and
   said upper and lower surface means and leading edge area resulting in an airfoil shape for increasing drag divergence Mach number over a wide range of lift coefficients.

2. An airfoil for a rotating blade comprising;
   airfoil means;
   said airfoil means having upper surface means, lower surface means, a leading edge area, and a trailing edge;
   said leading edge area of said upper surface means being shaped at approximately 1.25 percent chord and aft to limit the local Mach number to approximately 0.48 at the design maximum lift coefficient when the Mach number normal to the leading edge is approximately 0.20; and
   said upper and lower surface means being constructed and arranged for increasing drag divergence Mach number over a wide range of lift coefficients.

3. An airfoil for a rotating blade comprising;
   airfoil means;
   said airfoil means having upper surface means, lower surface means, a leading edge area, and a trailing edge;
   said lower surface means leading edge area being shaped to limit the local Mach number at said leading edge area and aft to approximately 0.29 when the Mach number normal to the leading edge is approximately 0.20 and the lift coefficient is in the range of 0.0 to −0.2; and
   said upper and lower surface means being constructed and arranged for increasing drag divergence Mach number over a wide range of lift coefficients.

4. An airfoil for a rotating blade as in claim 1 wherein the thickness of said trailing edge is approximately 2 percent of the total airfoil thickness.

5. An airfoil for a rotating blade comprising;
   airfoil means;
   said airfoil means having upper surface means, lower surface means, a leading edge area, and a trailing edge;
   said airfoil means has a root area, an intermediate area, and a tip area;
   said root area having a greater thickness and camber than said intermediate area;
   said intermediate area having a greater thickness and camber than said tip area;
   the thickness to chord ratio in the root area is 0.12, the thickness to chord ratio in the intermediate area is 0.10, and the thickness to chord ratio in the tip area is 0.08; and said upper and lower surface means being constructed and arranged for increasing drag divergence Mach number over a wide range of lift coefficients.

6. An airfoil for a rotating blade as in claim 5 wherein the root area is directly proportional to the intermediate area; and the intermediate area is directly proportional to the tip area.

* * * * *